United States Patent
Egan et al.

(10) Patent No.: US 10,941,693 B2
(45) Date of Patent: Mar. 9, 2021

(54) VEHICLE FRAME WITH ACOUSTIC VOLUME FOR AN EXHAUST SYSTEM

(71) Applicant: Faurecia Emissions Control Technologies, USA, LLC, Columbus, IN (US)

(72) Inventors: James Egan, Indianapolis, IN (US); Joseph E. Callahan, Greenwood, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 432 days.

(21) Appl. No.: 15/874,288

(22) Filed: Jan. 18, 2018

(65) Prior Publication Data

US 2019/0218955 A1 Jul. 18, 2019

(51) Int. Cl.

| F01N 13/00 | (2010.01) |
| F01N 1/02 | (2006.01) |
| B62D 21/17 | (2006.01) |
| F01N 1/00 | (2006.01) |

(52) U.S. Cl.
CPC .......... *F01N 13/001* (2013.01); *B62D 21/17* (2013.01); *F01N 1/003* (2013.01); *F01N 1/02* (2013.01); *F01N 2340/04* (2013.01)

(58) Field of Classification Search
CPC ........ F01N 13/001; F01N 1/003; F01N 1/023; F01N 1/02; F01N 2340/04; F01N 2340/06
See application file for complete search history.

(56) References Cited

U.S. PATENT DOCUMENTS

| 2,875,841 | A | * | 3/1959 | Henderson | B60K 13/06 180/296 |
| 3,116,803 | A | * | 1/1964 | Buchwald | B60K 13/04 180/309 |
| 3,135,347 | A | * | 6/1964 | Vranyosovics | B60K 13/06 180/296 |
| 3,163,251 | A | * | 12/1964 | Rees | B60K 13/06 180/309 |
| 3,402,785 | A | * | 9/1968 | Heath | F01N 1/023 181/250 |
| 3,990,414 | A | | 11/1976 | Malphettes | |
| 4,779,415 | A | | 10/1988 | Richardson et al. | |
| 5,285,640 | A | | 2/1994 | Olivo | |
| 5,493,080 | A | | 2/1996 | Moss | |
| 5,726,398 | A | * | 3/1998 | Zahn | B60K 13/06 181/282 |

(Continued)

FOREIGN PATENT DOCUMENTS

| EP | 1475522 | 11/2004 |
| EP | 2163739 | 3/2010 |

(Continued)

*Primary Examiner* — Edgardo San Martin
(74) *Attorney, Agent, or Firm* — Carlson, Gaskey & Olds, P.C.

(57) ABSTRACT

A vehicle exhaust system includes a first component that receives exhaust gas output from an engine and a second component that is fluidly coupled to the first component to define an upstream portion of a vehicle exhaust system. A vehicle frame member includes an internal acoustic volume. A pipe connects the internal acoustic volume in parallel to the upstream portion of the vehicle exhaust system.

26 Claims, 2 Drawing Sheets

(56) References Cited

U.S. PATENT DOCUMENTS

| | | | | |
|---|---|---|---|---|
| 6,668,972 B2* | 12/2003 | Huff | | B60K 13/04 |
| | | | | 181/228 |
| 6,990,804 B2 | 1/2006 | Jacob et al. | | |
| 7,240,769 B2* | 7/2007 | Nezan | | F01N 1/003 |
| | | | | 181/250 |
| 7,246,680 B2* | 7/2007 | Osterkamp | | F01N 1/02 |
| | | | | 180/296 |
| 7,588,007 B2* | 9/2009 | Hu | | F01N 1/02 |
| | | | | 123/184.21 |
| 8,312,713 B2* | 11/2012 | Takahashi | | F01N 3/02 |
| | | | | 60/311 |
| 8,453,792 B2* | 6/2013 | Wirth | | F01N 1/023 |
| | | | | 181/250 |
| 8,960,360 B2* | 2/2015 | Sangha | | B60K 13/06 |
| | | | | 180/309 |
| 9,482,148 B2 | 11/2016 | Wade et al. | | |
| 9,587,535 B2* | 3/2017 | Williams | | F01N 1/082 |
| 9,732,645 B2* | 8/2017 | Colette | | F01N 1/023 |
| 2005/0115229 A1 | 6/2005 | Worner et al. | | |
| 2008/0093162 A1* | 4/2008 | Marocco | | F01N 1/02 |
| | | | | 181/250 |
| 2010/0307143 A1* | 12/2010 | Colette | | F01N 1/003 |
| | | | | 60/299 |
| 2011/0203692 A1 | 8/2011 | Werni et al. | | |
| 2013/0333977 A1 | 12/2013 | Wirth et al. | | |
| 2017/0114698 A1 | 4/2017 | Jerges et al. | | |
| 2019/0093528 A1* | 3/2019 | Egan | | F01N 3/2885 |
| 2019/0292955 A1* | 9/2019 | Keesser | | F01N 1/24 |

FOREIGN PATENT DOCUMENTS

| | | |
|---|---|---|
| WO | 2008078020 | 7/2008 |
| WO | 2009106832 | 9/2009 |

* cited by examiner

VEHICLE FRAME WITH ACOUSTIC VOLUME FOR AN EXHAUST SYSTEM

BACKGROUND OF THE INVENTION

An exhaust system conducts hot exhaust gases generated by an engine through various exhaust components to reduce emissions, improve fuel economy, and control noise. Short exhaust systems, such as those encountered with hybrid vehicles or rear engine vehicles for example, often have insufficient volume and/or length to achieve a desired tailpipe noise level in combination with acceptable back pressure levels. Further, as gasoline particulate filter (GPF) technology emerges into the market, corresponding increases in exhaust system back pressure will need to be offset in order to avoid adverse effects on fuel economy or performance.

In addition to addressing issues raised by the introduction of GPF technology, other emerging powertrain technologies are requiring the industry to provide even more stringent noise reduction. The frequencies that need to be attenuated are being pushed to lower and lower frequencies not previously having to have been addressed. One traditional solution to attenuate such frequencies is to provide more internal volume; however, due to tight packaging constraints, the area required for such volume is not available. Another solution to attenuate these lower frequencies is to use valves; however, valves drive a higher back pressure at lower revolutions-per-minute, which is not desirable. As such, there is a need for unique acoustic solutions that are more efficient from a volume perspective and have less impact from a back pressure aspect.

SUMMARY OF THE INVENTION

In one exemplary embodiment, a vehicle exhaust system includes a first component that receives exhaust output from an engine and a second component that is fluidly coupled to the first component to define an upstream portion of a vehicle exhaust system. A vehicle frame member includes an internal acoustic volume. A pipe connects the internal acoustic volume in parallel to the upstream portion of the vehicle exhaust system.

In a further embodiment of the above, the internal acoustic volume is an airtight and sealed cavity.

In a further embodiment of any of the above, the internal acoustic volume comprises a parallel volume connected to the upstream portion of the vehicle exhaust system at a location downstream of the first component.

In a further embodiment of any of the above, the vehicle frame member comprises an engine sub-frame that is configured to at least partially support the engine.

In another exemplary embodiment, a vehicle exhaust system includes a first component that receives exhaust gas output from an engine, a first exhaust assembly that is fluidly coupled to the first component to define a hot end of a vehicle exhaust system, and a second exhaust assembly that is fluidly coupled to the first exhaust assembly to define a cold end of the vehicle exhaust system, wherein an exhaust gas temperature at the hot end is higher than at the cold end. The system also includes a frame member that includes an internal acoustic volume. A neck connects the internal acoustic volume in parallel to the hot end of the vehicle exhaust system.

In a further embodiment of any of the above, the first component comprises an exhaust manifold or turbocharger.

In a further embodiment of any of the above, the first exhaust assembly includes one or more of a catalytic converter, diesel oxidation catalyst, or a particulate filter.

In a further embodiment of any of the above, the second exhaust assembly comprises one or more mufflers coupled to one or more tailpipes.

In a further embodiment of any of the above, the frame member comprises a support beam configured to at least partially support the engine and that connects to at least one additional vehicle frame member.

In a further embodiment of any of the above, the frame member comprises at least first and second shells that enclose a hollow cavity that is completely sealed to provide the internal acoustic volume.

In a further embodiment of any of the above, the neck comprises a pipe that has a first end connected to the frame member and a second end connected to the first exhaust assembly, and wherein the pipe is at least partially flexible to accommodate movement of the engine and first exhaust assembly relative to frame member.

These and other features of this application will be best understood from the following specification and drawings, the following of which is a brief description.

DETAILED DESCRIPTION

Figure 1:
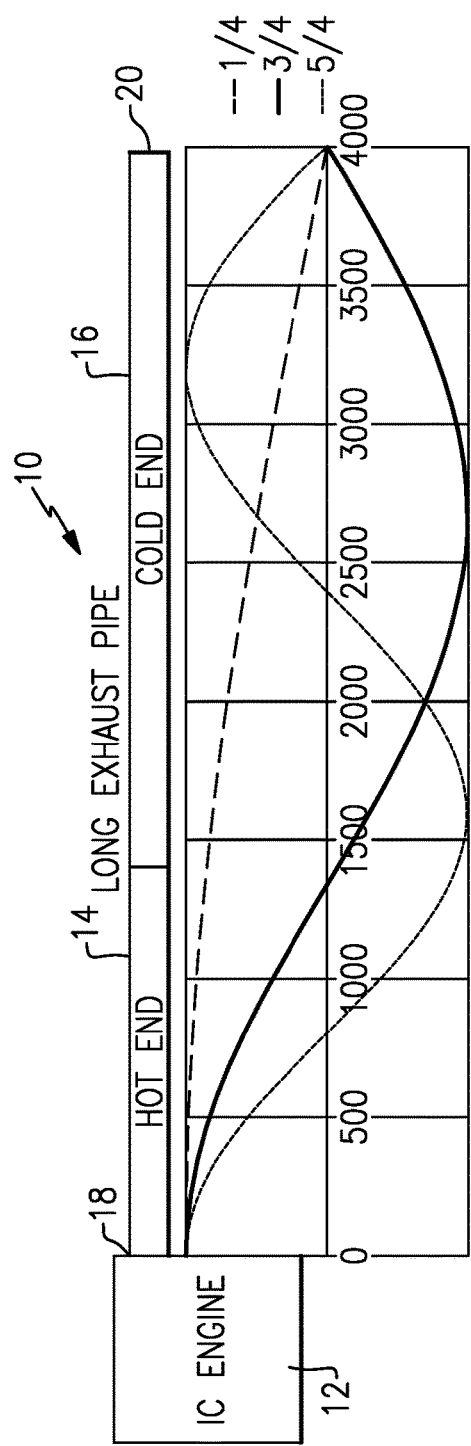
FIG. 1 schematically illustrates a vehicle exhaust system and shows standing pressure waves generated by the system.

FIG. 1 shows a schematic representation of a vehicle exhaust system 10 as a long pipe that conducts hot exhaust gases generated by an engine 12 through various exhaust components to reduce emission and control noise as known. The various exhaust components can include one or more of the following: pipes, filters, valves, catalysts, mufflers etc. The exhaust system 10 includes a hot end 14 that is located immediately downstream of the engine 12 and a cold end 16 that is downstream of the hot end 14. The exhaust gas temperature at the hot end 14 is higher on average than at the cold end 16. The long pipe is considered closed at an engine end 18 and open at an opposite end 20 where, after passing though the various exhaust components, the engine exhaust gas exits the exhaust system 10 to atmosphere.

Exhaust components at the hot end 14 can include, for example, exhaust gas treatment elements such as a diesel oxidation catalyst (DOC), a diesel particulate filter (DPF), a gasoline particulate filter (GPF), a three-way catalyst (TWC), and a selective catalytic reduction (SCR) catalyst that are used to remove contaminants from the exhaust gas as known. Exhaust gases pass through these components and enter the cold end 16 where the exhaust gas exits the system 10 via a tailpipe. The cold end 16 can include components such as mufflers, valves, and one or more tailpipes, for example. The described exhaust components can be mounted in various different configurations and combinations dependent upon vehicle application and available packaging space.

As discussed above, FIG. 1 shows the exhaust system schematically illustrated as a long pipe that is closed at the engine end 18 and open at the opposite end 20 to atmosphere. Acoustic waves will travel from their source, which is the engine 12, down the pipe and then the exit to atmosphere. When the acoustic wave encounters a boundary of some form, e.g. an impedance change, then some fraction of the wave will be reflected back the way it came and the remaining fraction will continue. In the case of a closed-open pipe such as shown in FIG. 1, this reflection occurs at the exit of the pipe. The reflected wave interferes with the incident wave and at certain frequencies, which are a function of the length of the pipe, constructively interfere to increase the level of the wave and also to make the wave appear stationary. Such waves are called standing waves and in the case of a closed-open pipe the frequencies of such waves may be calculated with the equation below.

$$Fn=(nc)/(4L) \text{ where:}$$

fn=resonant frequency of standing wave n (Hz)
n=ordinal number of standing wave
c=speed of sound (m/s)
L=length of closed-open pipe (m)

The chart of FIG. 1 shows the first three standing pressure waves for a closed-open pipe of 4 meters in length. In this example, the resonances occur at 22, 65 and 108 Hz. As shown, for each standing wave the pressure is a maximum (anti-node) at the closed engine end 18 and a minimum (node) at the open end 20 to atmosphere. The ideal place for a Helmholtz resonator is at a pressure anti-node. As such, the best position for a resonator is at the engine outlet; however, Helmholtz resonators are not traditionally used in the hot end 14 of exhaust systems 10. The subject invention provides a Helmholtz resonator in the hot end 14 to provide improved acoustic benefits over the same resonator as placed in the cold end 16 as the subject resonator is closer to the anti-node for all system acoustic resonances.

It has been shown through testing and simulations that a Helmholtz Resonator, such as an acoustic volume of the order of 2 to 4 liters (L) connected in parallel with the exhaust flow via a neck pipe for example, that is positioned in the hot end 14 between a turbo outlet and a converter, or between converter after-treatment elements, provides an acoustic benefit about twice that of a similar amount of volume applied in the cold end 16 (downstream of the after-treatment) with no impact on back pressure. From a tailpipe noise perspective, positioning the Helmholtz resonator as close as possible to the engine 12 provides the best acoustic performance.

Figure 2:
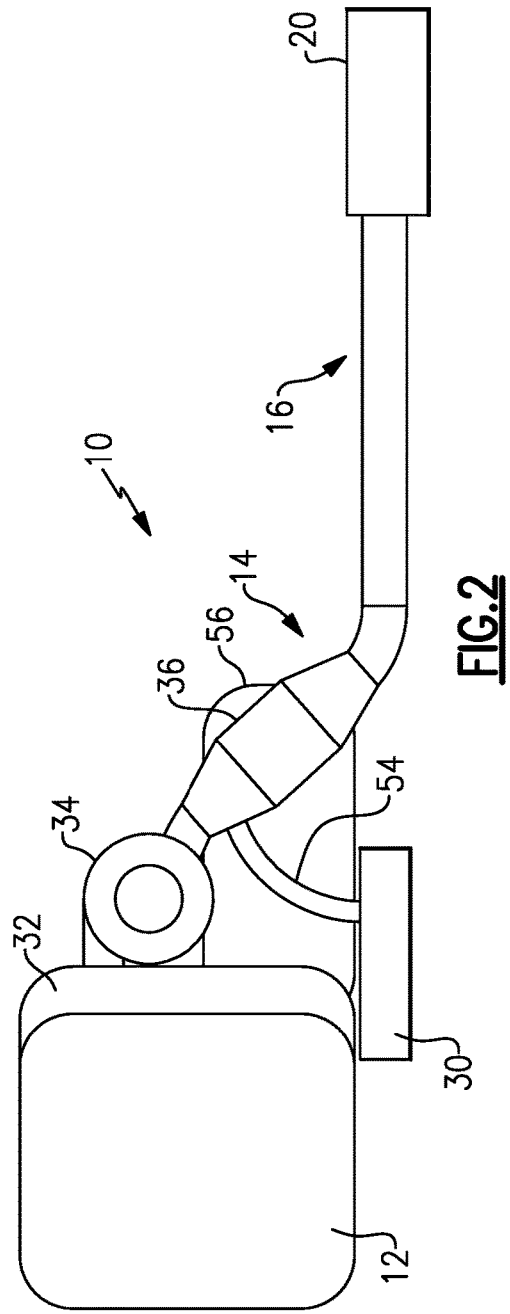
FIG. 2 shows a schematic representation of one example of a vehicle frame member that includes an internal acoustic volume that is connected to a hot end component of the system of FIG. 1.

The subject invention proposes packaging one or more Helmholtz Resonators at one of various locations in the hot end 14 of the system 10. The difficulty with this proposal; however, is that there is very little packaging space available at the hot end 14 of the system. In order to overcome this packaging issue, it is proposed to use an already existing vehicle component as the Helmholtz volume. FIG. 2 shows one example of the exhaust system 10 that utilizes a vehicle frame member 30 to provide an acoustic volume.

Figure 3:
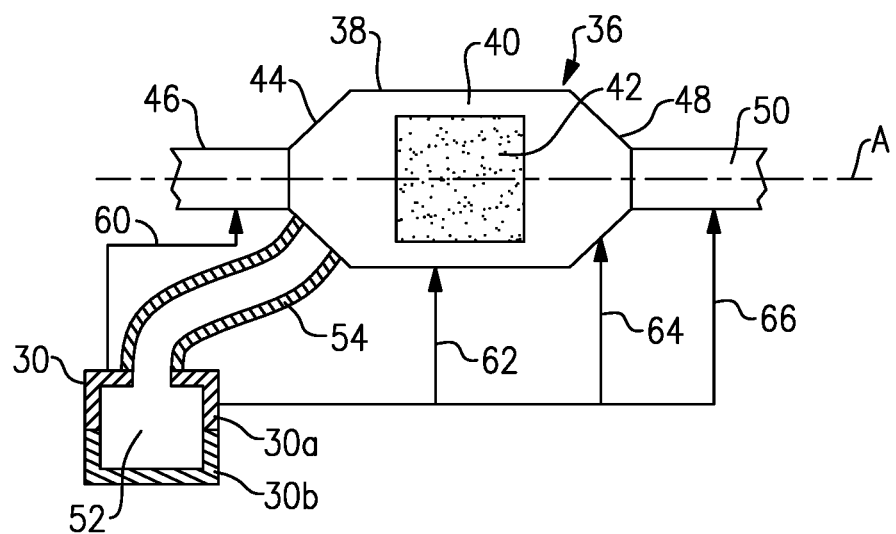
FIG. 3 is a schematic representation of a catalytic converter coupled to an internal acoustic volume of the frame member of FIG. 2.

As shown in FIGS. 2-3, the engine 12 has an exhaust manifold 32 that directs hot engine exhaust gases into the vehicle exhaust system 10. An optional turbocharger 34 may be positioned between the manifold 32 and the exhaust system 10. In this example, the hot end 14 includes a hot end component 36, such as a catalytic converter for example, which includes a component housing 38 that defines an internal cavity 40. At least one exhaust gas treatment element 42 is positioned within the internal cavity 40. An inlet cone 44 directs flow into the exhaust gas treatment element 42. The inlet cone 44 receives hot engine exhaust gases from an inlet pipe 46. An outlet cone 48 directs treated exhaust gas flow exiting the exhaust gas treatment element 42 into an outlet pipe 50. In this example, the component housing 38 defines a center axis A and the inlet cone 44, exhaust gas treatment element 42, and outlet cone 48 are coaxial with the center axis A.

The vehicle frame member 30 provides an internal acoustic volume 52 that is enclosed within the frame member 30. The internal acoustic volume 52 is fluidly coupled in parallel to the hot end 14 of the exhaust system 10 with a connecting pipe or neck 54. In one example, the vehicle frame member 30 comprises an engine sub-frame that extends underneath the engine 12 to support the engine 12 and possibly a vehicle transmission 56 or gearbox. The engine 12 and transmission 56 are schematically shown in FIG. 2, and it should be understood that any type of engine 12 and/or transmission 56 can be used with the subject exhaust system 10.

In one example shown in FIG. 3, the frame member 30 is comprised of a least two sub-components or rigid shells 30a, 30b of stamped metal that enclose a hollow cavity. In another example, the frame member 30 can be formed via hydroforming, for example, to provide a single-piece outer housing structure with a hollow cavity. In each example, the hollow cavity is completely sealed and is airtight to provide the internal acoustic volume 52. This volume 52 is a parallel volume to the hot end 14 of the exhaust system 10 and is connected to the system downstream of the manifold 32 and/or turbocharger 34 with the pipe or neck 54. In one example, the pipe or neck 54 comprises a body that has at least one partially flexible portion to accommodate movement of the engine 12 and exhaust system relative to the frame member 30.

In the example shown in FIGS. 2-3, the neck 54 is positioned to connect the internal acoustic volume 52 to the internal cavity 40 via the inlet cone 44. Optionally, or in addition to, the connection point of the neck 54 to the hot end 14 could be immediately upstream of the inlet cone 44 (see 60), at a center portion of the housing 38 (see 62), at the outlet cone 48 (see 64), or immediately downstream of the outlet cone 48 (see 66).

In each of these different configurations, the internal acoustic volume 52 is sealed and in parallel with the exhaust flow through the exhaust system such that there is no net flow in the Helmholtz resonator. Hot engine exhaust gas flows into the component 36 through the inlet pipe 46, expands and slows down as the gas travels through inlet cone 44, passes through the exhaust gas treatment element 42, then contracts and passes through the outlet cone 48 before exiting into the outlet pipe 50. The neck 54 connects the internal acoustic volume 52 in parallel with the flow through the component 36 to provide the Helmholtz resonator.

The exhaust gas pressure pulsations from the engine 12 travel down through the exhaust system 10 and are modified as they travel through the mechanisms of restriction, reflection, and absorption. When the pulsations reach the location of the flexible neck 54 they cause the exhaust gas in the resonator neck/connection to start moving. For low frequencies this gas can be considered as a lumped mass. The lumped mass of gas in the resonator neck 54 compresses or rarifies the exhaust gas in the internal acoustic volume 52. As the lumped mass of gas compresses this volume 52, the volume pressure increases. As the lumped mass of gas rarifies, the volume pressure decreases. The result of this pressure is to push the lumped mass in the opposite direction to which it is travelling. In this way, the engine sub-frame volume 52 is acting as a spring and provides a spring-mass system with a tuned frequency. As there is no net flow through the Helmholtz resonator in parallel with the exhaust system, and as the resonator neck 54 comprises a side-branch arrangement, the impact on back pressure is negligible.

Figure 4:
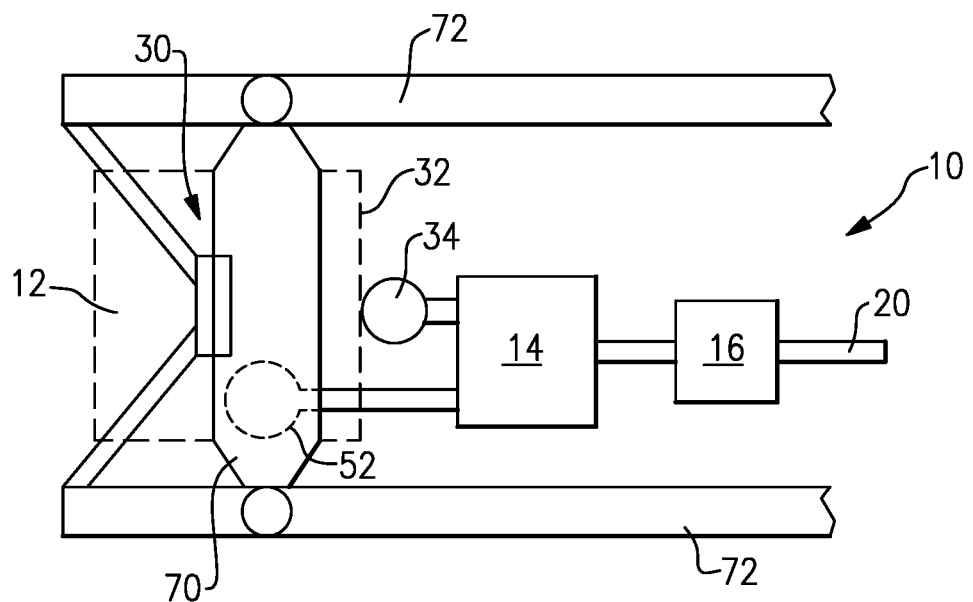
FIG. 4 shows another example embodiment of a frame member.

FIG. 4 shows an example configuration where the vehicle frame member 30 comprises a support beam 70 that extends between vehicle side frame members 72. In this example, the acoustic volume 52 is sealed within an internal cavity of the support beam 70. The volume 52 is connected to the hot end 14 of the exhaust system via the neck 54. Optionally, or in addition to, the volume 52 could be located within a sealed internal cavity of the side frame members 72.

The subject invention combines a tuning element with the primary function of acoustic attenuation with a component in the hot end 14 of the exhaust system 10 at a location that is much closer to the pressure anti-node at the engine exhaust outlet than traditional configurations. This provides improved acoustic efficiency with negligible back pressure impact resulting in tailpipe noise/acoustic volume improvement. Further, by including an acoustic volume within the already existing engine sub-frame structure, packaging problems are significantly reduced.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A vehicle exhaust system comprising:
   a first component that receives exhaust gas output from an engine;
   a second component fluidly coupled to the first component to define an upstream portion of a vehicle exhaust system, wherein the second component includes a component housing that defines an internal cavity and has at least one exhaust gas treatment element that is positioned within the internal cavity;
   a vehicle frame member including an internal acoustic volume; and
   a pipe that connects the internal acoustic volume in parallel to the upstream portion of the vehicle exhaust system, wherein the pipe has a first end connected to the vehicle frame member and a second end that is associated with the second component such that the second end is connected directly at the second component.

2. The vehicle exhaust system according to claim 1 wherein the internal acoustic volume is an airtight and sealed cavity.

3. The vehicle exhaust system according to claim 1 wherein the internal acoustic volume comprises a parallel volume connected to the upstream portion of the vehicle exhaust system at a location downstream of the first component.

4. The vehicle exhaust system according to claim 1 wherein the first component comprises an exhaust manifold or turbocharger.

5. The vehicle exhaust system according to claim 4 wherein the second component comprises a catalytic converter.

6. The vehicle exhaust system according to claim 5 wherein the component housing comprises an inlet cone that receives hot engine exhaust gases from an inlet pipe and directs flow into the at least one exhaust gas treatment element located in a center portion of the component housing, and an outlet cone that directs treated exhaust gas flow exiting the at least one exhaust gas treatment element into an outlet pipe, and wherein the second end is connected to the inlet cone, center portion, or outlet cone.

7. The vehicle exhaust system according to claim 1 wherein the pipe comprises a flexible pipe.

8. The vehicle exhaust system according to claim 1 including a downstream portion of the vehicle exhaust system that is coupled to the upstream portion, wherein the downstream portion is subjected to lower exhaust gas temperatures than the upstream portion.

9. The vehicle exhaust system according to claim 1 wherein the vehicle frame member comprises an engine sub-frame that is configured to at least partially support the engine.

10. A vehicle exhaust system comprising:
    a first component that receives exhaust gas output from an engine;
    a first exhaust assembly fluidly coupled to the first component to define a hot end of a vehicle exhaust system, wherein the first exhaust assembly includes a component housing that defines an internal cavity and has at least one exhaust gas treatment element that is positioned within the internal cavity;
    a second exhaust assembly fluidly coupled to the first exhaust assembly to define a cold end of the vehicle exhaust system, wherein an exhaust gas temperature at the hot end is higher than at the cold end;
    a frame member that includes an internal acoustic volume; and
    a neck that connects the internal acoustic volume in parallel to the hot end of the vehicle exhaust system, and wherein the neck has a first end connected to the frame member and a second end that is associated with the first exhaust assembly such that the second end is connected directly at the second component.

11. The vehicle exhaust system according to claim 10 wherein the internal acoustic volume is an airtight and sealed cavity.

12. The vehicle exhaust system according to claim 11 wherein the internal acoustic volume comprises a parallel volume connected to the hot end of the vehicle exhaust system downstream of the first component.

13. The vehicle exhaust system according to claim 12 wherein the neck comprises a body that includes at least one flexible portion.

14. The vehicle exhaust system according to claim 13 wherein the first component comprises an exhaust manifold or turbocharger.

15. The vehicle exhaust system according to claim 14 wherein the first exhaust assembly includes one or more of a catalytic converter, diesel oxidation catalyst, or a particulate filter.

16. The vehicle exhaust system according to claim 15 wherein the second exhaust assembly comprises one or more mufflers coupled to one or more tailpipes.

17. The vehicle exhaust system according to claim 13 wherein the first exhaust assembly includes at least one catalytic converter having the component housing with a center portion that surrounds at least one substrate that comprises the at least one exhaust gas treatment element, an inlet cone positioned at one end of the center portion of the component housing, and an outlet cone positioned at an opposite end of the center portion of the component housing, and wherein the neck is connected to at least one of the center portion of the component housing, the inlet one, and the outlet cone.

18. The vehicle exhaust system according to claim 10 wherein the frame member comprises a support beam configured to at least partially support the engine and that connects to at least one additional vehicle frame member.

19. The vehicle exhaust system according to claim 10 wherein the frame member comprises at least first and second shells that enclose a hollow cavity that is completely sealed to provide the internal acoustic volume.

20. The vehicle exhaust system according to claim 19 wherein the neck comprises a pipe that is at least partially flexible to accommodate movement of the engine and first exhaust assembly relative to the frame member.

21. The vehicle exhaust system according to claim 10 wherein the first component comprises a turbocharger that is immediately downstream of an exhaust manifold, and wherein the component housing comprises a center portion that surrounds the at least one exhaust gas treatment element that comprises at least one substrate, an inlet cone positioned at one end of the center portion, and an outlet cone positioned at an opposite end of the center portion, and wherein the neck is connected to the center portion.

22. The vehicle exhaust system according to claim 10 wherein the first component comprises a turbocharger that is immediately downstream of an exhaust manifold, and wherein the component housing comprises a center portion that surrounds the at least one exhaust gas treatment element that comprises at least one substrate, an inlet cone positioned at one end of the center portion, and an outlet cone positioned at an opposite end of the center portion, and wherein the neck is connected to the inlet cone or outlet cone.

23. The vehicle exhaust system according to claim 10 wherein the second exhaust assembly comprises one or more mufflers coupled to one or more tailpipes, and wherein the neck is separate from the one or more mufflers and is only located within the hot end upstream of the one or more mufflers.

24. The vehicle exhaust system according to claim 1 wherein the first component comprises a turbocharger that is immediately downstream of an exhaust manifold, and wherein the component housing comprises a center portion that surrounds the at least one exhaust gas treatment element that comprises at least one substrate, an inlet cone positioned at one end of the center portion, and an outlet cone positioned at an opposite end of the center portion, and wherein the pipe is connected to the center portion.

25. The vehicle exhaust system according to claim 1 wherein the first component comprises a turbocharger that is immediately downstream of an exhaust manifold, and wherein the component housing comprises a center portion that surrounds the at least one exhaust gas treatment element that comprises at least one substrate, an inlet cone positioned at one end of the center portion, and an outlet cone positioned at an opposite end of the center portion, and wherein the pipe is connected to the inlet cone or outlet cone.

26. The vehicle exhaust system according to claim 1 wherein the first and second components comprise a hot end of the vehicle exhaust system, and including a cold end of the vehicle exhaust system wherein an exhaust gas temperature at the hot end is higher than at the cold end, and wherein the cold end comprises an exhaust component assembly that includes one or more mufflers coupled to one or more tailpipes, and wherein the pipe is separate from the one or more mufflers and is only located within the hot end upstream of the one or more mufflers.

\* \* \* \* \*

UNITED STATES PATENT AND TRADEMARK OFFICE
CERTIFICATE OF CORRECTION

PATENT NO. : 10,941,693 B2
APPLICATION NO. : 15/874288
DATED : March 9, 2021
INVENTOR(S) : James Egan and Joseph E. Callahan Page 1 of 1

It is certified that error appears in the above-identified patent and that said Letters Patent is hereby corrected as shown below:

In the Claims

In Claim 10, Column 6, Line 41; replace "at the second component." with --at the first exhaust assembly.--

In Claim 17, Column 7, Line 4; replace "the inlet one" with --the inlet cone--

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*